United States Patent [19]
Miller

[11] 3,965,810
[45] June 29, 1976

[54] NUT CRACKER
[76] Inventor: Jess Miller, Rte. 13, Box 183B, Fort Worth, Tex. 76119
[22] Filed: May 27, 1975
[21] Appl. No.: 580,573

[52] U.S. Cl. ............................................. 99/581
[51] Int. Cl.² ...................... A23N 5/00; A47J 43/26
[58] Field of Search ............ 99/581, 551, 574, 582, 99/575, 579, 580, 583, 577, 578; 68/21, 94, 243

[56] References Cited
UNITED STATES PATENTS

| | | | |
|---|---|---|---|
| 234,577 | 11/1880 | Huffman | 68/243 |
| 404,016 | 5/1889 | Quackenbush | 99/581 |
| 1,188,373 | 6/1916 | Ross | 68/243 |
| 2,031,189 | 2/1936 | Stromberg | 99/579 |

Primary Examiner—Leonard D. Christian
Assistant Examiner—Donald B. Massenberg
Attorney, Agent, or Firm—Wofford, Felsman, Fails & Zobal

[57] ABSTRACT

Disclosed herein is an apparatus for cracking nuts that comprises back and front end plates connected together by a plurality of rods. The rods are attached at their end portions to the respective plates by pivotal connections and are spaced and disposed in an array that together with the plates defines an enclosure. One of the plates contains an aperture for the insertion of a nut to be cracked within the enclosure defined by the rods. Rotating one plate with respect to the other constricts the enclosed space, thereby cracking the nut within.

5 Claims, 6 Drawing Figures

U.S. Patent   June 29, 1976   3,965,810
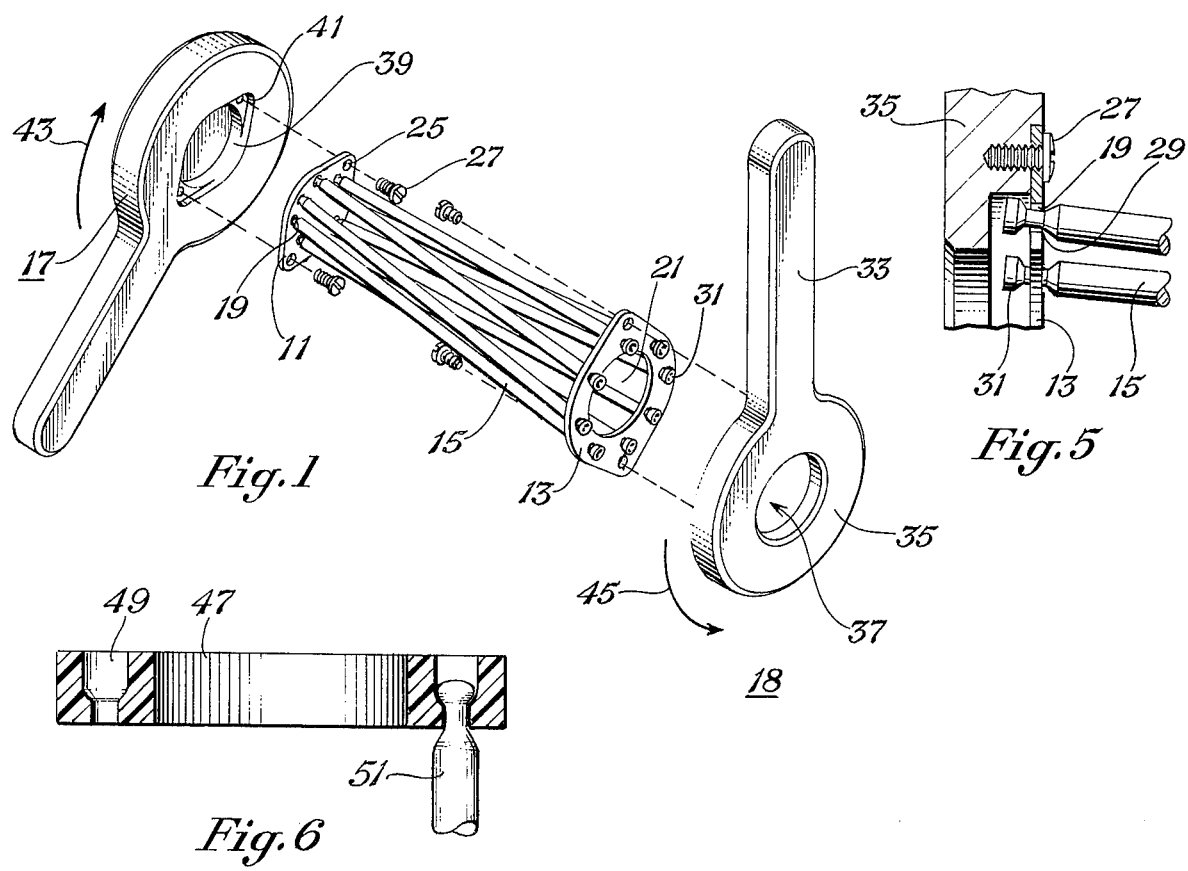
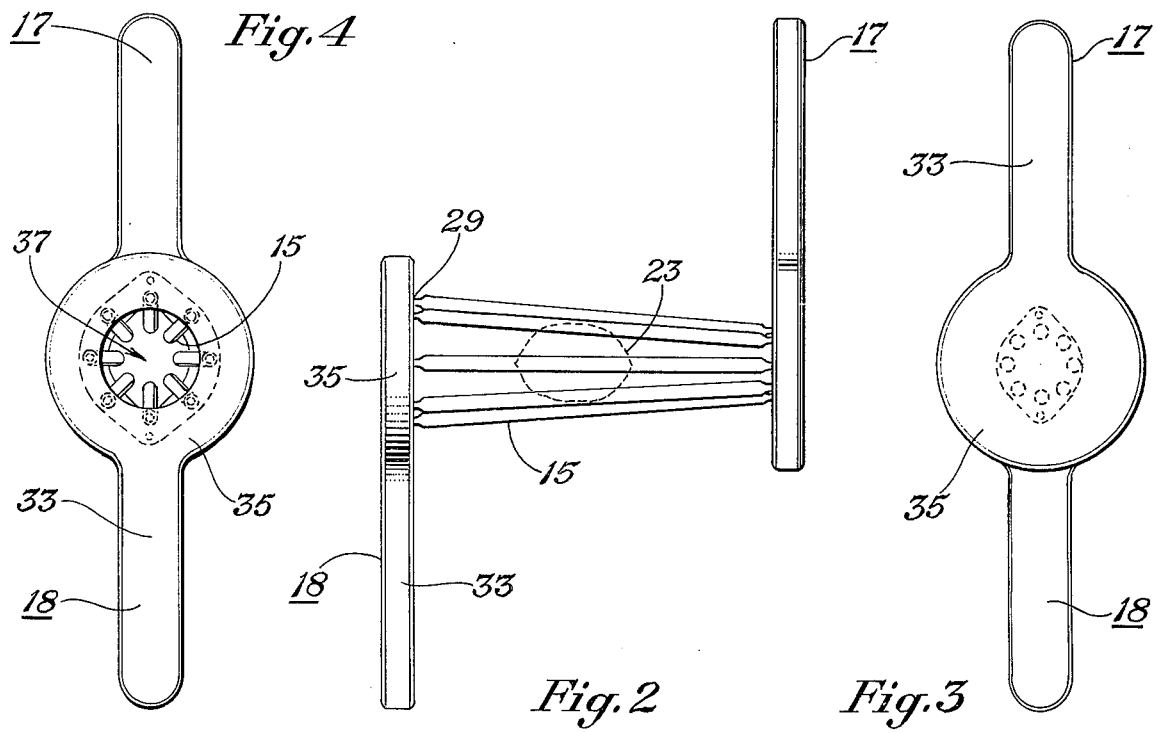

NUT CRACKER

BACKGROUND OF THE INVENTION

1. Field of the Invention

This invention relates in general to nut cracking devices and in particular to a small, hand-operated nut cracker.

2. Background and Prior Art

Manually operated devices of various designs for cracking nuts and the like are known in the art. Some of the devices are fairly large and complex, and are fastened to a table or the like. Many of the devices for occasional use in the home are small enough to be carried from room to room and may employ a principle similar to a pliers; that is, the nut is cracked by squeezing the handles together; or they may employ a principle similar to a screw clamp.

An object of this invention is to provide an improved hand carried and hand operated nut cracker that is simple, durable and effective.

Another object of this invention is to provide a hand operated nut cracker small enough to be carried about the house, that cracks nuts other than by squeezing two handles together or operating a new screw clamp, yet is of simple construction.

BRIEF DESCRIPTION OF THE DRAWING

FIG. 1 is an exploded schematic perspective view of a nut cracker constructed in accordance with the principles of this invention.

FIG. 2 is a side elevational view of the nut cracker of FIG. 1.

FIG. 3 is an elevational view of the nut cracker of FIG. 1 as viewed from the rear end.

FIG. 4 is an elevational view of the nut cracker of FIG. 1 as viewed from the front end.

FIG. 5 is a fragmentary vertical sectional view showing certain details of the nut cracker of FIGS. 1–4.

FIG. 6 is a section view showing end plate and rod end structure in accordance with another embodiment of the invention.

Description of the Preferred Embodiment

Referring to the drawing, FIG. 1 illustrates a nut cracker which comprises a back plate 11 and a front plate 13 connected together by a plurality of rods 15. Actuators 17, 18 for assisting in rotating each plate 11, 13 are attached to each plate.

The back plate 11 is a flat plate, normally of metal, having a plurality of holes 19, spaced about the periphery of the plate in a circle, for the insertion of rods 15. The front plate 13 is similar to the back plate 11 in that it contains holes 19 for the insertion of rods 15, and differs in that it contains, in addition, a center aperture, designated as numeral 21, for the insertion of a nut 23, indicated by the phantom lines in FIG. 2. The aperture 21 must be large enough to allow the largest type of nut anticipated to be cracked to be inserted.

In the embodiment shown, the circular array of holes 19 spaced about the periphery of front plate 13 is of a larger diameter that the array of back plate 11. This provides a reduction in the diameter of the space enclosed by the rods 15 from the front to the back, thereby defining a frusto-conical enclosure as shown in FIG. 2. The degree of taper in the frusto-conical shape determines the approximate contact point of the rods 15 when one plate is rotated fully with respect to the other. Both of the plates 11, 13 contain holes 25 through which screws 27 are inserted for attaching the plates 11, 13 to actuators 17, 18.

The degree of taper of the rods 15 is not critical and it is within the scope of the invention for the rods to taper in either direction or not at all. It is to be preferred, however, that the rods be tapered generally as shown in FIG. 2.

The rods 15 are elongated members and may be made of any suitable material having sufficient strength and bending resistance, as for example, metal. The rods 15 are pivotally connected to each plate 11, 13 as shown in FIG. 5. Each rod has a notched or necked portion 29 of diameter smaller than hole 19, so that loose connection is made between the rod and plate. A retaining portion 31 of each rod 15 is of larger diameter than respective hole 19, thereby preventing rod 15 from becoming detached from the plates.

The particular arrangement for retaining the rods in the end plates is not critical, nor is rod end configuration; the essential requirement being simply that the rods be retained by and pivotally connected to the end plates.

In the embodiment shown by FIG. 6, the end plates 47 are made of plastic material that is sufficiently deformable to permit the rounded end portions of the rods 51 to be inserted in the openings 49.

The actuators 17, 18 aid in gripping and rotating plates 11, 13, which serve as supporting bases of the nut cracker. Each actuator 17, 18 in the embodiment shown contains an elongated portion to be used as a handle 33, and a generally circular body 35 attached to the plates 11, 13. Actuator 18, attached to the front plate 13, contains an aperture, designated by numeral 37, for the insertion of a nut. A shoulder 39 and threaded hole 41 are recessed within each actuator body 35 for the insertion and attachment of plates 11, 13. Each actuator 17, 18 is thich enough for comfort in gripping, and may be made of any suitable material, as for example, metal, plastic, or wood.

To operate the nut cracker, initally a nut 23 is inserted through apertures 37 and 21 while the nut cracker is in the open position as shown in FIG. 2. At this position each rod 15 is approximately parallel to the rods 15 adjacent it, and the enclosed space defines a frusto-conical enclosure. If the nut inserted is large enough, it will not drop to the end of the enclosure. Once it lodges, the handles 33 of the actuator 17, 18 are grasped and either rotated in opposite directions as shown by the arrows 43, 45 in FIG. 1, or one is rotated while holding the other stationary. The rotation causes the enclosed space defined by the rods 15 to constrict, cracking the nut. There will be a point along the enclosed space wherein the rods 15 will come into contact with each other if the handles 33 are rotated fully while the enclosed space is empty of nuts. Thus, if the nut is too small to be lodged at a point in the enclosed space while the nut cracker is in open position, the nut should be allowed to slide to the approximate contact point before placing the nut cracker in the crack position.

It should be apparent from the foregoing that a nut cracker embodying the principles of the invention is simple, durable, effective and unique.

Having described the invention in connection with certain embodiments thereof, it is understood that further modifications may suggest themselves to those skilled in the art and it is intended to cover such modifications as fall within the scope of the appended claims.

What is claimed is:

1. A nut cracker comprising:
back and front end plates, the front end plate having an aperture for the insertion of nuts to be cracked;
a plurality of elongated members, each of which is pivotally connected at its end portion to said plates;
said elongated members being spaced and disposed in an array defining together with said plates an enclosure for retaining a nut within;
so that rotating one plate with respect to the other constricts said enclosure to crack nuts.

2. The invention as defined by claim 1 wherein actuators are provided to coact with said plates and afford leverage to facilitate relative rotation of the plates when cracking nuts.

3. The invention as defined by claim 1 wherein said enclosure for retaining a nut within is of a frusto-conical configuration the base of which is at the nut inserting end.

4. A nut cracker comprising:
a first plate having a plurality of holes spaced in a closed loop array about the periphery;
a second plate having a plurality of holes spaced in a closed loop array about the periphery and an aperture in the center of said array for the insertion of a nut;
a plurality of elongated members, each of which has necked end portions loosely retained in respective said holes in said first and second plates, thereby forming pivotal connections with each of said plates;
actuators coacting with said plates for facilitating rotation of one plate with respect to the other plate when cracking a nut.

5. The invention as defined by claim 4 wherein said closed loop array of holes in the nut receiving plate is larger than said closed loop array of holes in said other plate, so that said elongated members together with said plates define an enclosed frusto-conical nut retaining space.

* * * * *